United States Patent
Nystrom

(12) 
(10) Patent No.: US 6,560,383 B1
(45) Date of Patent: May 6, 2003

(54) HIGH EFFICIENCY INSULATION FOR IMPROVING THERMAL EFFICIENCY OF BUBBLE OPTICAL SWITCH

(75) Inventor: Michael J. Nystrom, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 194 days.

(21) Appl. No.: 09/846,482

(22) Filed: Apr. 30, 2001

(51) Int. Cl.[7] ............................. G02B 6/26; G02B 6/42
(52) U.S. Cl. ...................................................... 385/16
(58) Field of Search ............................. 385/16, 17, 18, 385/125

(56) References Cited

U.S. PATENT DOCUMENTS

| | | | |
|---|---|---|---|
| 5,699,462 A | * 12/1997 | Fouquet et al. | 385/18 |
| 6,055,344 A | * 4/2000 | Fouquet et al. | 385/16 |
| 6,360,775 B1 | * 3/2002 | Barth et al. | 137/828 |
| 6,487,333 B2 | * 11/2002 | Fouquet et al. | 385/18 |
| 2001/0024556 A1 | * 9/2001 | Beguin et al. | 385/125 |
| 2002/0159676 A1 | * 10/2002 | Nystrom et al. | 385/16 |

OTHER PUBLICATIONS

Ware, Andrew, "New Photonic–Switching Technology for All–Optical Networks", Lightwave, Mar. 2000 (4 pages).

Israelsohn, Joshua, "Switching the Light Fantastic", EDN, Oct. 26, 2000, pp. 113–123.

* cited by examiner

*Primary Examiner*—Khiem Nguyen
*Assistant Examiner*—Hae Moon Hyeon

(57) ABSTRACT

An optical switch includes a core, a fluid reservoir coupled to the core via a tube, a thermal solution, and an insulating structure. The core includes a base, a matrix controller substrate, and a planar lightwave circuit. The planar lightwave circuit has a plurality of waveguides and trenches for rerouting an optical stream. The fluid reservoir supplies fluid to the plurality of trenches of the core. The core and the fluid reservoir are mounted on the thermal solution, which maintains the fluid reservoir at a higher temperature than the core by removing heat from the core and transferring some heat to the fluid reservoir. The insulating structure reduces any thermal leakage from the fluid reservoir to the core. In addition, the insulating structure can improve the temperature of the planar lightwave circuit and prevent unwanted atmospheric gases from entering the optical switch.

20 Claims, 1 Drawing Sheet

HIGH EFFICIENCY INSULATION FOR IMPROVING THERMAL EFFICIENCY OF BUBBLE OPTICAL SWITCH

FIELD OF THE INVENTION

The present invention relates to optical switches. More particularly, the present invention relates to insulation for improving the thermal efficiency of a bubble optical switch.

BACKGROUND OF THE INVENTION

One type of optical switch is based on inkjet printer technology and planar lightwave circuit technology. These optical switches route an optical stream from one path to another without having to convert the signal from optical, to electronic, and back to optical. Instead, these optical switches use bubbles, which are formed by vaporizing the fluid in the optical switch, to switch light signals from one optical fiber to another. The optical switches have a planar lightwave circuit, which includes a grid of intersecting paths or waveguides, mounted on a matrix controller substrate. At a cross point of two waveguides is a trench filled with fluid that has the same optical properties as the glass in the waveguides. As a result, light or an optical stream and its communications contents can travel unimpeded through the cross point.

When the optical signal needs to be rerouted, a bubble heater warms the appropriate trench to insert a vapor bubble at the cross point. The vapor bubble alters the optical properties of the cross point, thereby causing the light to be reflected along a different path. The bubbles can be formed and removed hundreds of times per second, providing a fast and reliable switching function, one without the use of mirrors or other mechanical moving parts.

This type of optical switch has a core, which includes the bubble heaters and the planar lightwave circuit, and a fluid reservoir. The fluid reservoir supplies the fluid to the trenches in the planar lightwave circuit. The optical switch can form a bubble and set up a switch path in under 10 milliseconds. In order for the optical switch to quickly switch among optical paths, the fluid reservoir must be kept a temperature higher than that of the core of the switch. The optical switch includes thermoelectric coolers, which ensure that the core of the switch is maintained at a lower temperature than the fluid reservoir. The thermoelectric coolers remove heat from the core of the optical switch and pump a portion of that heat to the fluid reservoir.

One problem with this type of optical switch is that thermal leakage occurs between the fluid reservoir and the core of the optical switch, with heat from the fluid reservoir leaking into the core. This thermal leakage causes the thermoelectric coolers to work harder, as the thermoelectric coolers must remove the heat that has leaked from the fluid reservoir, in addition to the heat that is generated by the electronic circuitry in the core. The additional work of the thermal electric coolers creates more heat, which also must be dissipated. The amount of heat that the optical switch must dissipate affects the size of the heat sink and ultimately, the size of the switch. Thus, it would be desirable to minimize the amount of thermal leakage between the fluid reservoir and the core of the optical switch.

Another problem present in this type of optical switch is the thermal gradient of the planar lightwave circuit. The bottom surface of the planar lightwave circuit is closer to the bubble heaters of the matrix controller substrate than the top surface where the bubbles are formed in the trenches. Thus, there is some heat loss at the top surface of the planar lightwave circuit. Variation in temperature across the planar lightwave circuit can adversely affect operation of the optical switch. Thus, it is desirable to provide an optical switch with a planar lightwave circuit that has both a more uniform temperature profile and a more stable temperature.

Still another problem with these optical switches is the accumulation over time of atmospheric gases in the fluid of the optical switch. Because the optical switch uses vapor bubbles rather than air bubbles, a substantial accumulation of atmospheric gases can affect performance of the optical switch. There is a need, therefore, for an optical switch that is better insulated from the seepage of atmospheric gases into the optical switch.

SUMMARY OF THE INVENTION

In accordance with one embodiment of the present invention, an optical switch includes a core, a fluid reservoir and a thermal solution. The core includes a base, a matrix controller substrate mounted on the base, and a planar lightwave circuit. The planar lightwave circuit has a plurality of waveguides and a plurality of trenches. Each trench is located at an intersection of two waveguides. The fluid reservoir contains a fluid, which the reservoir supplies via a tube to the plurality of trenches of the core. The core and the fluid reservoir are mounted on the thermal solution. The thermal solution maintains the fluid reservoir at a higher temperature than the core, by removing heat from the core and transferring at least a portion of the heat to the fluid reservoir. The optical switch further includes an insulating structure that covers the core and the fluid reservoir. The insulating structure prevents thermal leakage from the fluid reservoir to the core and improves the temperature profile of the planar lightwave circuit. In addition, the insulating structure can prevent atmospheric gases from seeping into the optical switch. Materials used in the insulating structure include aerogels and xerogels.

In accordance with another embodiment of the present invention, a method of making an optical switch includes providing an optical switch having a core, a fluid reservoir coupled to the core via a tube, and a thermal solution. The optical switch has the features described above. The method further includes providing a clam-shell device having a top half and a bottom half, and placing a first membrane in the top half of the clam-shell device and a second membrane in the bottom half. The first and second membranes are then filled with an insulating material, and the optical switch is placed in the clam-shell device. The clam-shell device is then closed on the optical switch, and the first and second membranes containing the insulating material are vacuum formed about the optical switch. The first membrane covers an upper surface of the core, the fluid reservoir and the tube, and the second membrane extends along a bottom of the tube and covers an area between the core and the fluid reservoir. The first and second membranes that are filled with the insulating material reduce a thermal leakage between the fluid reservoir and the core and improve the temperature profile of the planar lightwave circuit of the core.

In accordance with still another embodiment of the present invention, a method of making an optical switch includes providing an optical switch and surrounding the core, the tube and the fluid reservoir of the optical switch with a membrane. The method further includes filling the membrane with an insulating material and applying a vacuum and sealing the core, the tube, the fluid reservoir and the insulating material in the membrane. The membrane can be made of an aluminum or polymeric film, and the insulating material can include aerogels and xerogels. The insulating material isolates the fluid reservoir from the core to minimize heat loss from the fluid reservoir as well as to improve the temperature profile of the planar lightwave circuit. In addition, the vacuum-sealed membrane and insulating material prevent unwanted atmospheric gases from entering the optical switch.

BRIEF DESCRIPTION OF THE DRAWINGS

The present invention may be better understood, and its numerous objects, features, and advantages made apparent to those skilled in the art by referencing the accompanying drawings, wherein like reference numerals are used for like parts in the various drawings.

DETAILED DESCRIPTION

Figure 1:
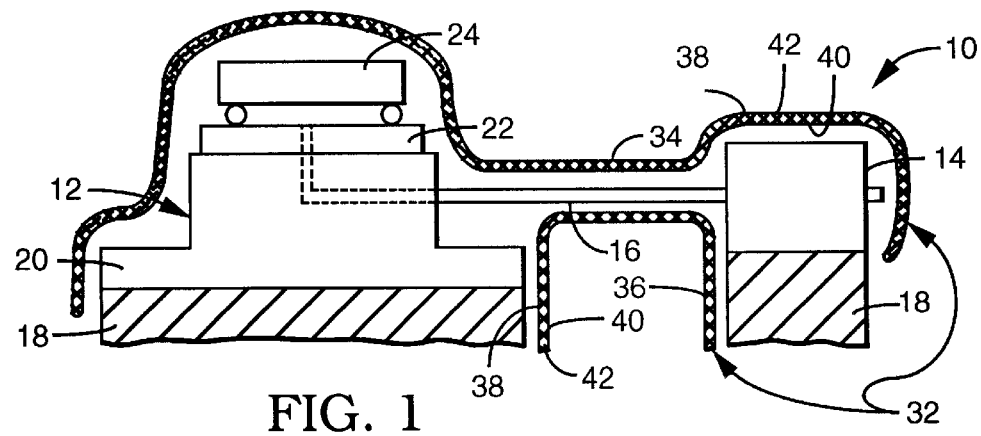
FIG. 1 is a schematic view of an optical switch including a core, a fluid reservoir and an insulating structure, in accordance with one embodiment of the present invention.

Referring now to FIG. 1, an optical switch 10, in accordance with the present invention, includes a core 12 and a fluid reservoir 14. The fluid reservoir 14 is coupled to the core 12 via a tube 16 and supplies a working fluid (not shown) to the core 12 of the optical switch 10. The core 12 and fluid reservoir 14 are mounted on a thermal solution 18. The optical switch 10 is formed on a silicon chip using conventional microelectronic manufacturing techniques.

The core 12 of the optical switch 10 includes a base 20, a matrix controller substrate 22 and a planar lightwave circuit 24. The base 20 is made of molybdenum. Alternatively, the base 18 may be made of other suitable materials, such as tungsten, aluminum nitride, silicon carbide, and special thermally matched alloys. The matrix controller substrate 22 is a silicon chip that is mounted to the base 20 and includes a plurality of bubble heaters (not shown). The tube 16 extends from the fluid reservoir 14, through the base 20 and to the matrix controller substrate 22 to provide fluid to the core 12 of the optical switch 10. The planar lightwave circuit 24 is mounted on and sealed to the matrix controller substrate 22.

Figure 2:
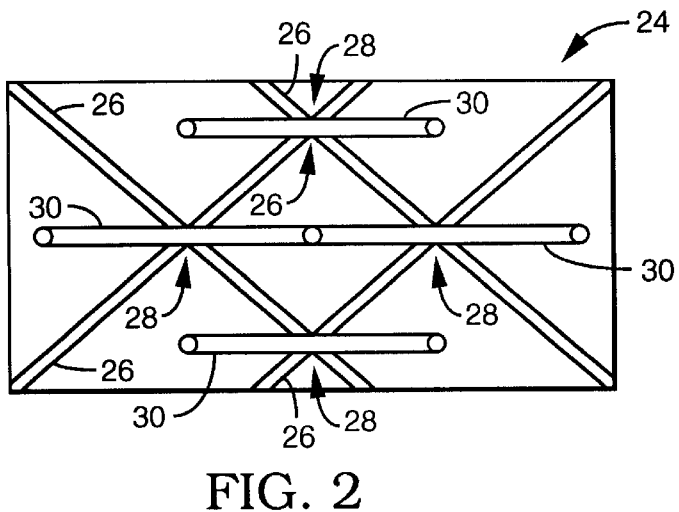
FIG. 2 is a partial plan view of the core of the optical switch, illustrating the waveguides and trenches formed in a planar lightwave circuit of the core.

As illustrated in FIG. 2, the planar lightwave circuit 24, which is made primarily of silicon dioxide, includes an array of permanently aligned waveguides 26. Each waveguide 26 is a glass channel that directs light down a defined optical path. The waveguides 26 intersect one another at various cross points 28 on the planar lightwave circuit 24.

The planar lightwave circuit 24 further includes a plurality of trenches 30 formed therein. Each trench 30 is located at a cross point 28 of two waveguides 26. The trenches 30 are filled with fluid that is supplied by the fluid reservoir 14 through the tube 16 to the planar lightwave circuit 24. The fluid in the trenches 30 has the same optical properties as the glass of the waveguides 26. Thus, light passing through a cross point 28 travels unimpeded through the fluid in the trench 30.

As discussed above, the matrix controller substrate 22, which is located beneath the planar lightwave circuit 24, includes a plurality of bubble heaters. Each bubble heater is associated with a corresponding trench 30. When the appropriate bubble heater is activated, the bubble heater heats the fluid in the appropriate trench 30 to vaporize the fluid and create a bubble in that trench 30. The presence of the bubble in the trench changes the refractive index of the trench, so that it differs from the refractive index of the glass in the waveguide 26. Accordingly, light, which in the absence of a bubble in the trench, would pass through the waveguide 26 unimpeded, is reflected, at a cross point 28, down a different waveguide.

In order for the optical switch 10 to quickly switch among optical paths, the fluid reservoir 14 must be kept at a higher temperature than the core 12 of the optical switch 10. The core 12 is maintained at temperature between 20° C. and 70° C., while the fluid reservoir 14 is maintained at approximately 2° C. to 15° C. warmer than the core 12. The thermal solution 18, on which the core 12 and the fluid reservoir 14 are mounted, includes thermoelectric coolers (not shown) and a heat sink (not shown) to maintain the core 12 and the fluid reservoir 14 at their respective temperatures. The thermoelectric coolers remove from the core 12 heat that has been generated by the electronic circuitry in the core 12. A portion of that heat is dissipated via the heat sink, while the remainder is pumped to the fluid reservoir 14 to maintain the fluid reservoir 14 at a higher temperature than the core 12. The thermal solution 18 also removes heat that has leaked from the fluid reservoir 14 to the core 12. This thermal leakage from the fluid reservoir 14 causes the thermoelectric coolers in the thermal solution 18 to work harder, which in turn generates more heat that must be removed from the core 12.

In order to reduce or minimize thermal leakage from the fluid reservoir 14, the optical switch 10 further includes an insulating structure 32. The insulating structure 32 includes a top section 34 and a bottom section 36. The top section 34 extends from an upper portion of the thermal solution 18 and covers the planar lightwave circuit 24 of the core 12, the tube 16 and the fluid reservoir 14. The bottom section 36 extends beneath the tube 16 and covers an area between the core 12 and the fluid reservoir 14.

Each of the top and bottom sections 34 and 36, respectively, of the insulating structure 32 includes a first layer of film 38, a second layer of film 40, and an insulating material 42 disposed between the first and second layers of film 38 and 40. The first and second layers of film 38 can be a polymeric film, such as a MYLAR polyester film available from DuPont. These polymeric films are strong, heat-shrinkable, and have high- and low-temperature resistance. In addition, they provide an outstanding barrier to gas and water vapor. One of ordinary skill in the art will appreciate that other suitable films may also be used as the first and second layers 38 and 40 of the insulating structure 32.

The insulating material 42 that is disposed between the first and second layers of film 38 and 40, respectively, is preferably an aerogel material or an xerogel material. Aerogels and xerogels have a very low thermal conductivity and are highly porous with very small pores. This combination makes aerogels and xerogels excellent thermal insulators. A small layer of an aerogel or xerogel is extremely effective at providing thermal isolation and does not take up much space. In addition, the thermal insulating properties of aerogels and xerogels can be further increased by evacuating the space that they occupy. The super insulating properties of aerogels and xerogels make them well suited for the insulating structure 32 and do not significantly increase the overall size of the optical switch 10.

The insulating structure 32 effectively separates the fluid reservoir 14 from the core 12. Because each of the top section 34 and the bottom section 36 of the insulating structure 32 is formed closely around the core 12 and the fluid reservoir 14 of the optical switch 10, thermal leakage from the fluid reservoir 14 to the core 12 is significantly reduced or prevented. Thus, the amount of heat that the thermoelectric coolers of the thermals solution 18 must remove from the core 12 is reduced, since the thermoelectric coolers need only remove the heat that is generated by the electronic circuitry in the core 12. Less heat must also be pumped to the fluid reservoir 14 to maintain it at the higher temperature, since the insulating structure 32 retains the heat at the fluid reservoir 14.

The insulating structure 32 also provides a more uniform temperature profile for the planar lightwave circuit 24 of the core 12 as well as maintains the planar lightwave circuit 24 at a stable temperature. As discussed above, the planar lightwave circuit 24 has a thermal gradient from the bottom surface of the planar lightwave circuit 24 to the top surface. The bottom surface, which is located closer to the bubble heaters of the matrix controller substrate 22, is warmer than the exposed top surface where the bubbles are formed. The top section 34 of the insulating structure 32 encloses the planar lightwave circuit 24 to reduce the thermal gradient by preventing the escape of heat from the top surface. By reducing the thermal gradient across the planar lightwave circuit 24, the insulating structure 34 enables the planar lightwave circuit 24 to have a more uniform temperature profile, thereby improving the operation of the optical switch. The top section 34 of the insulating structure 32 also increases and stabilizes the overall temperature of the planar lightwave circuit 24.

The insulating structure 32 is vacuum-formed about the optical switch 10 using a clam-shell device (not shown). The clam-shell device has a top half and a bottom half. First and second membranes are inserted into the respective top and bottom halves of the clam-shell device. Each membrane preferably includes the two layers of polymeric film. The membranes are then filled with the insulating material, such as the aerogel or xerogel material. The optical switch, which has been manufactured using conventional microelectronic manufacturing techniques, is inserted into the clam-shell device, and the top and bottom halves are brought together around the optical switch. The first and second membranes, which have been filled with the insulating material, are vacuum-formed and sealed about the optical switch, such that the first membrane fits closely over the upper portion of the thermal solution 18, the core 12, the tube 16 and the fluid reservoir 14, while the second membrane extends long the bottom of the tube to cover the area between the core 12 and the fluid reservoir 14.

Figure 3:
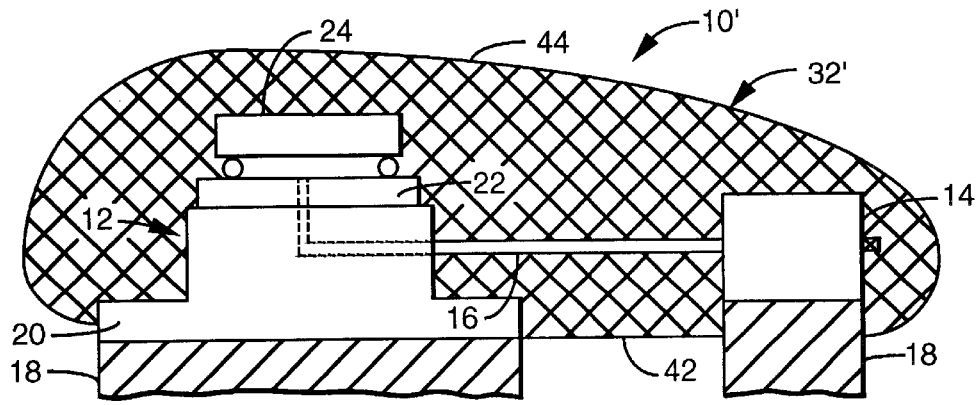
FIG. 3 is a schematic view of an optical switch including a core, a fluid reservoir and an insulating structure, in accordance with another embodiment of the present invention.

FIG. 3 illustrates an optical switch 10' having an insulating structure 32', in accordance with another embodiment of the present invention. The insulating structure 32' fully encases the core 12, the tube 16, and the fluid reservoir 14 in a sealed, leak-proof membrane 44 filled with the insulating material 42. The membrane 44 can be made of an aluminum film or a polymeric film and is either attached to or fits between the thermal contacts of the optical switch 10. Other suitable materials may also be used for the membrane 44. The membrane 44 is sealed to prevent atmospheric gases from entering the optical switch 10'.

The insulating structure 32' minimizes the amount of heat that can leak from the fluid reservoir 14 to the core 12 of the optical switch 10', by fully encasing each in the insulating material 42. This improved insulation reduces the amount of heat that must be pumped by the thermal solution 18 between the parts. The insulating structure 32' also reduces the thermal gradient across the planar lightwave circuit 24 of the core 12 and stabilizes its temperature, by preventing a loss of heat from the top surface of the planar lightwave circuit 24.

In addition, the vacuum-sealed membrane 44 further improves the life of the optical switch 10' by reducing the rate, at which atmospheric gases can enter the optical switch 10' and accumulate in the fluid. As discussed above, the optical switch is adversely affected by atmospheric gases. The aerogel or xerogel insulating material 44 also can act as a getter for atmospheric gases, trapping gases in the pores of the material, when the insulating material 44 is processed in a vacuum at slightly elevated temperatures. Thus, the leak rate of the insulating structure 32' can be further improved to extend the life of the optical switch 10'.

The insulating structure 32' is constructed on the optical switch 10' by surrounding the core 12, the fluid reservoir 14 and the tube 16 with the membrane 44, and filling the membrane 44 with the insulating material 42. Once the membrane 44 is filled with the insulating material 42, a vacuum is applied, and the membrane 44 is sealed.

While particular embodiments of the present invention have been shown and described, it will be obvious to those of ordinary skill in the art that changes and modifications may be made without departing from this invention in its broader aspects. Thus, the appended claims are to encompass within their scope all such changes and modifications as fall within the true spirit and scope of this invention.

What is claimed is:

1. An optical switch comprising:

a core including a base, a matrix controller substrate mounted on the base, and a planar lightwave circuit mounted on the matrix controller substrate, the planar lightwave circuit having a plurality of waveguides and a plurality of trenches, each trench being located at an intersection of two waveguides;

a fluid reservoir containing a fluid and supplying the fluid via a tube to the plurality of trenches of the core;

a thermal solution mounted beneath the core and the fluid reservoir, the thermal solution removing heat from the core of the optical switch and transferring at least a portion of the heat to the fluid reservoir; and an insulating structure covering the core and the fluid reservoir of the optical switch.

2. The optical switch of claim 1, wherein the thermal solution maintains the fluid reservoir at a temperature in the range of approximately 2° C. to 15° C. warmer than the core.

3. The optical switch of claim 1, wherein the insulating structure includes an insulating material, the insulating material being one of an aerogel and an xerogel.

4. The optical switch of claim 3, wherein the insulating structure further includes a first layer of film and a second layer of film, and wherein the insulating material is disposed between the first and second layers of film.

5. The optical switch of claim 1, wherein the insulating structure includes a top section and a bottom section, the top section extending from an upper portion of the thermal solution and covering an upper surface of the core, the fluid reservoir and the tube, the bottom section extending along a bottom of the tube and covering an area between the core and the fluid reservoir.

6. The optical switch of claim 5, wherein the insulating structure is vacuum formed to fit closely around the core and fluid reservoir.

7. The optical switch of claim 1, wherein the insulating structure includes a membrane encasing the core, the tube and the fluid reservoir of the optical switch, the membrane being filled with an insulating material.

8. The optical switch of claim 7, wherein the insulating material is one of an aerogel and an xerogel.

9. The optical switch of claim 7, wherein the insulating structure is vacuum sealed to encase the core, the tube and the fluid reservoir, the vacuum sealed insulating structure preventing atmospheric gases from entering the optical switch.

10. A method of making an optical switch comprising:
providing an optical switch having a core, a fluid reservoir, and a thermal solution, the core and the fluid reservoir being mounted on the thermal solution, the core including a base, a matrix controller substrate mounted on the base, and planar lightwave circuit mounted on the matrix controller substrate, the planar lightwave circuit having a plurality of intersecting waveguides and a plurality of trenches, the fluid reservoir being coupled to the core via a tube;
providing a clam-shell device having a top half and a bottom half;
placing a first membrane in the top half of the clam-shell device and a second membrane in the bottom half;
filling the first and second membranes with an insulating material;
inserting the optical switch into the clam-shell device; and
vacuum forming the first and second membranes containing the insulating material about the optical switch, the first membrane covering an upper surface of the core, the fluid reservoir and the tube, the second membrane extending along a bottom of the tube and covering an area between the core and the fluid reservoir.

11. The method of claim 10, wherein the thermal solution maintains the fluid reservoir at a temperature in the range of approximately 2° C. to 15° C. warmer than the core.

12. The method of claim 10, wherein the insulating material is one of an aerogel and an xerogel.

13. The method of claim 10, wherein the membrane includes a polymeric film.

14. A method of making an optical switch comprising:
providing an optical switch having a core, a fluid reservoir, and a thermal solution, the core and the fluid reservoir being mounted on the thermal solution, the core including a base, a matrix controller substrate mounted on the base, and planar lightwave circuit mounted on the matrix controller substrate, the planar lightwave circuit having a plurality of intersecting waveguides and a plurality of trenches, the fluid reservoir being coupled to the core via a tube;
surrounding the core, the tube and the fluid reservoir with a membrane;
filling the membrane with an insulating material; and
applying a vacuum and sealing the core, the tube and the fluid reservoir in the membrane filled with the insulating material.

15. The method of claim 14, wherein the thermal solution maintains the fluid reservoir at a temperature in the range of approximately 2° C. to 15° C. warmer than the core.

16. The method of claim 14, wherein the membrane is coupled to the thermal solution of the optical switch.

17. The method of claim 14, wherein the membrane includes an aluminum film.

18. The method of claim 14, wherein the membrane includes a polymeric film.

19. The method of claim 14, wherein the insulating material is one of an aerogel and an xerogel.

20. The method of claim 14, wherein the insulating material isolates the fluid reservoir from core to minimize heat loss from the fluid reservoir.

* * * * *